(12) United States Patent
Gall et al.

(10) Patent No.: US 8,356,476 B2
(45) Date of Patent: Jan. 22, 2013

(54) DIESEL SILENCER CAPABLE OF TIER 3 OR TIER 4 OPERATION

(76) Inventors: Scott Gall, Peoria, IL (US); Eric Delgado, Peoria, IL (US); Ryan Murphy, Peoria, IL (US); Zach Halcomb, Peoria Heights, IL (US)

(*) Notice: Subject to any disclaimer, the term of this patent is extended or adjusted under 35 U.S.C. 154(b) by 301 days.

(21) Appl. No.: 12/852,621

(22) Filed: Aug. 9, 2010

(65) Prior Publication Data

US 2012/0031699 A1 Feb. 9, 2012

(51) Int. Cl.
*F01N 3/10* (2006.01)

(52) U.S. Cl. ........... 60/299; 60/274; 60/295; 60/311; 60/312; 60/322; 60/324; 181/219; 181/228; 181/240; 181/259

(58) Field of Classification Search .......... 60/274, 60/295, 299, 301, 303, 311, 312, 322, 324; 181/219–220, 228, 240, 259

See application file for complete search history.

(56) References Cited

U.S. PATENT DOCUMENTS

| | | | | | |
|---|---|---|---|---|---|
| 3,649,213 | A | * | 3/1972 | De Palma et al. | 422/176 |
| 5,378,435 | A | * | 1/1995 | Gavoni | 422/177 |
| 6,915,877 | B2 | * | 7/2005 | Khayalian | 181/272 |
| 6,935,105 | B1 | | 8/2005 | Page et al. | |
| 7,219,764 | B1 | * | 5/2007 | Forbes | 181/270 |
| 7,549,511 | B2 | * | 6/2009 | Marocco | 181/270 |
| 7,610,993 | B2 | * | 11/2009 | Sullivan | 181/268 |
| 8,083,026 | B1 | * | 12/2011 | Butler | 181/264 |
| 2006/0201144 | A1 | | 9/2006 | Gabe et al. | |

* cited by examiner

*Primary Examiner* — Binh Q Tran
(74) *Attorney, Agent, or Firm* — Clifford Kraft

(57) ABSTRACT

A Tier 4 ready silencer that can accept both DOCs and DPFs to meet Tier 3 and can interface with an SCR system to meet Tier 4. The invention includes a silencer compartment with empty filter/catalyst banks in the shape of a V. DOCs and DPFs can be added and arranged in the V-shaped banks as needed. Various exhaust fins direct exhaust flow through the filters/catalysts. Multiple exhaust inlets to the device provide the most direct route possible from the engine outlets. A mixing tube and an SCR system can be added to the output port to comply with Tier 4.

20 Claims, 6 Drawing Sheets

DIESEL SILENCER CAPABLE OF TIER 3 OR TIER 4 OPERATION

BACKGROUND

1. Field of the Invention

The present invention relates generally to silencers for diesel engines and more particularly to a silencer capable of meeting RICE NEHAP, Tier 3 and/or Tier 4 regulations.

2. Description of the Prior Art

Prior art silencers will not accept both diesel oxidation catalysts (DOC) and diesel particulate filters (DPF) to meet Tier 3 or RICE NESHAP regulations. Gabe et al. in U.S. application 2006/0201144 describe an exhaust gas cleaning system without these devices. Page et al. in U.S. Pat. No. 6,935,105 describe an integrated apparatus for removing pollutants from an exhaust stream using both a DOC and a DPF; however, this is not a silencer. It would be advantageous to have a silencer that will accept both types of devices to meet Tier 3, RICE NESHAP and can also accept a selective catalytic reduction system (SCR) to meet Tier 4.

SUMMARY OF THE INVENTION

The present invention relates to a Tier 4 ready silencer that can accept both DOCs and DPFs to meet Tier 3 or RICE NESHAP and can interface with an SCR system to meet Tier 4 EPA emissions regulations. The invention includes a silencer compartment with empty filter/catalyst banks in the shape of a V. DOCs or DPFs can be added and arranged in the V-shaped banks as needed. Various exhaust fins direct exhaust flow through the filters/catalysts. Multiple exhaust inlets to the device provide the most direct route possible from the engine outlets. A mixing tube that can be stainless steel or other suitable material and an SCR system can be added to the output port to comply with Tier 4.

DESCRIPTION OF THE FIGURES

Attention in now directed to several figures that illustrate features of the invention.

Several drawings and illustrations have been presented to aid in understanding the present invention. The scope of the present invention is not limited to what is shown in the figures.

DESCRIPTION OF THE INVENTION

The present invention relates to a Tier 4 ready diesel silencer. It is known that to reach Tier 3 regulations, it is necessary to use diesel particular filters (DPF), and to reach RICE NESHAP regulations it is necessary to use diesel oxidation catalysts (DOC). In addition, to reach Tier 4, a selective catalytic reduction system (SCR) must be used. The present invention allows Tier 3 or RICE NESHAP operation in a silencer by placing DOCs or DPFs inside the silencer. An external SCR can bring it to Tier 4.

Figure 1:
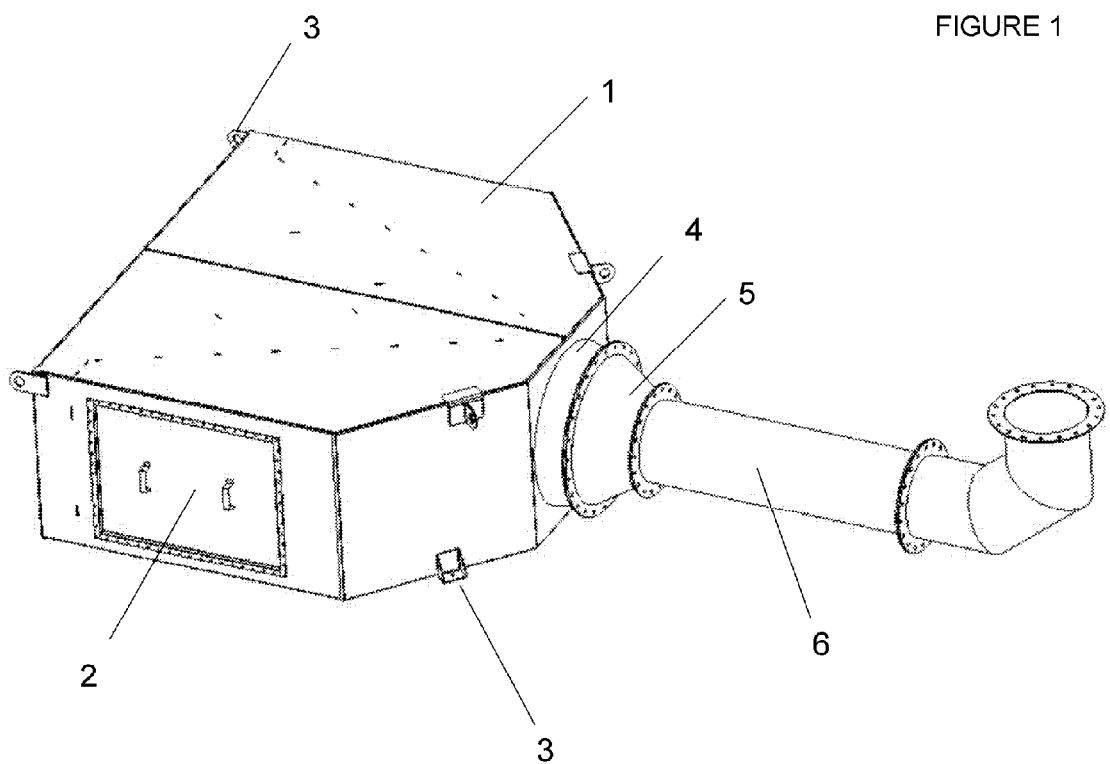
FIG. 1 shows a top perspective view of an embodiment of the invention.

FIG. 1 shows a top perspective view of an embodiment of the invention. A chamber 1 has a door, mounting brackets, and exhaust port 4, a reducer 5, and an exhaust pipe with elbow. This unit can be adapted to operate at Tier 3.

Figure 2:
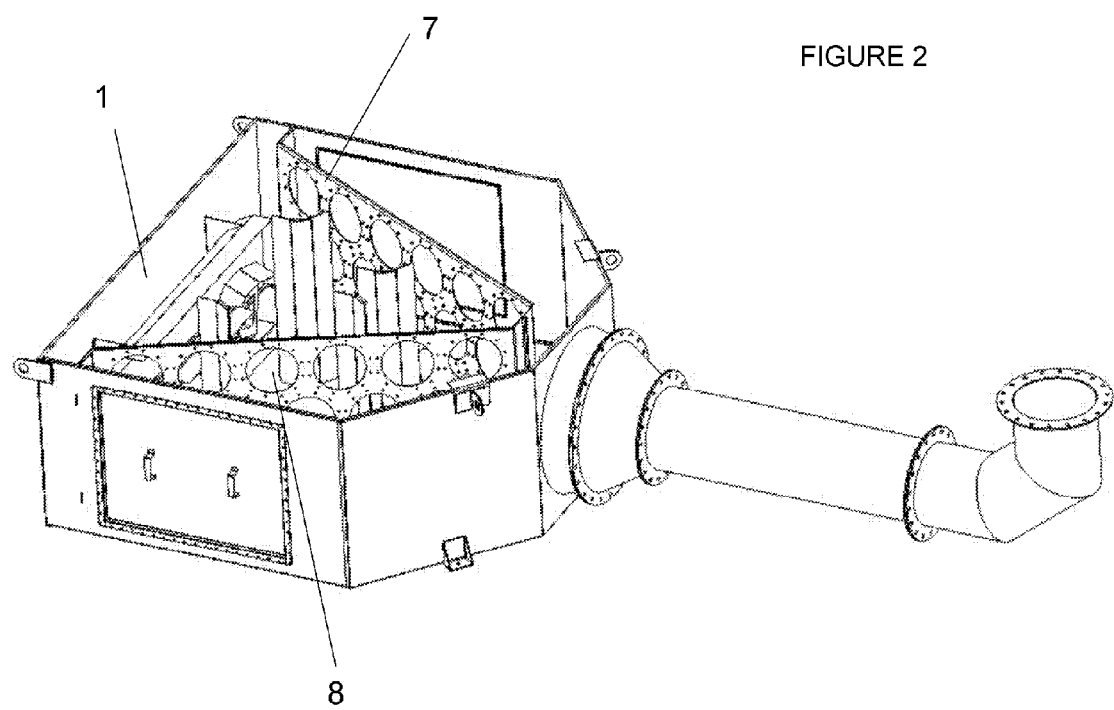
FIG. 2 shows the embodiment of FIG. 1 with the top removed and no filters/catalysts.

FIG. 2 shows the unit with the top off. It can be seen that a V-shaped filter bank 7 extends from the back of the unit (left) to the front of the unit (right). This V-shaped bank 7 contains numerous holes 8 that are designed to receive either DOCs or DPFs, or can be blocked off.

Figure 3:
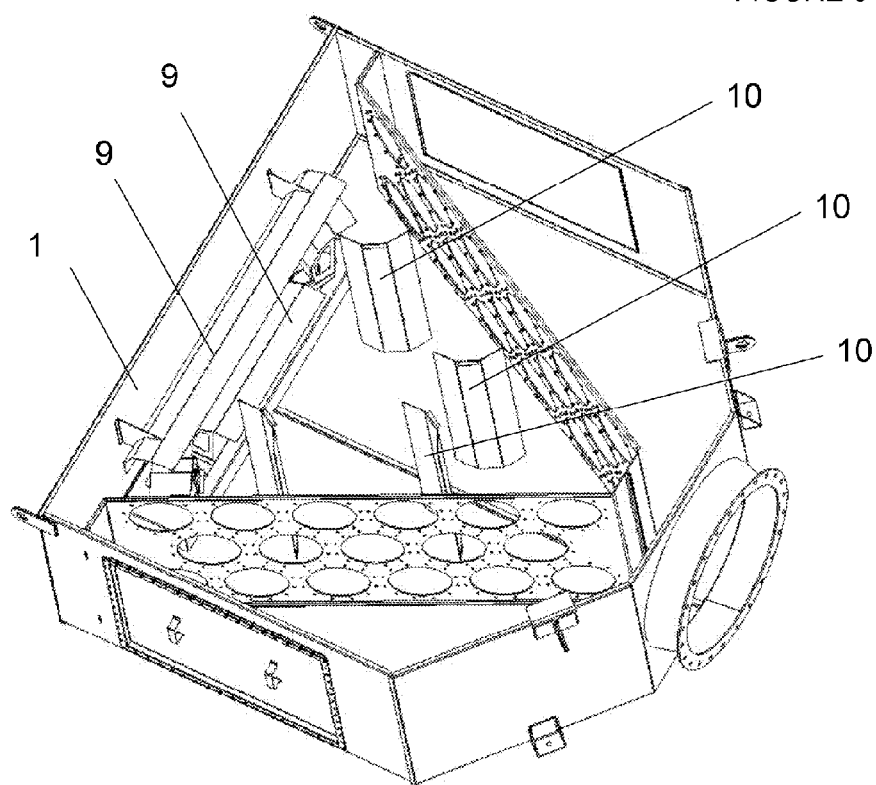
FIG. 3 shows a view from a higher angle showing horizontal and vertical exhaust fins.

FIG. 3 shows a more vertical view of the chamber 1. Horizontal exhaust vanes 9 and vertical exhaust vanes 10 direct the flow of exhaust gas through the bank 7 and hence through the inserted catalysts/filters. These vanes 9, 10 are designed to provide optimal flow and distribution of the flow. The vanes 9, 10 can be made from sheet metal strips bent with several parallel partial bends. The horizontal vanes 9 can be of at least two different types as shown in FIG. 3.

Figure 4:
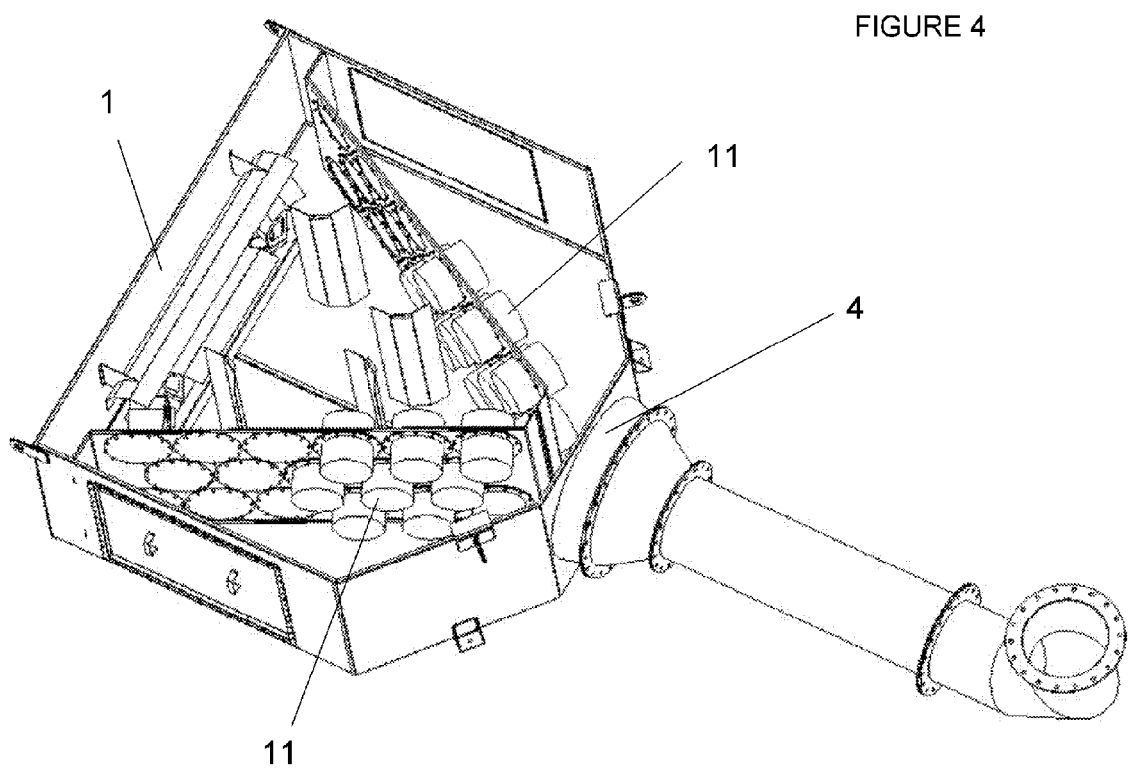
FIG. 4 shows the unit with the filter/catalyst banks partly filled.

FIG. 4 shows a chamber 1 that is loaded with DOCs or DPFs 11. To exit the unit into the exhaust port 4, all of the gas must flow through the inserted catalysts/filters. The number of DOCs or DPFs 11 used depends on the back pressure limits of the engine. Fewer filters are needed to stay within engine limits when there is no external SCR attached. Unused locations can be covered with block-off plates.

Figure 5:
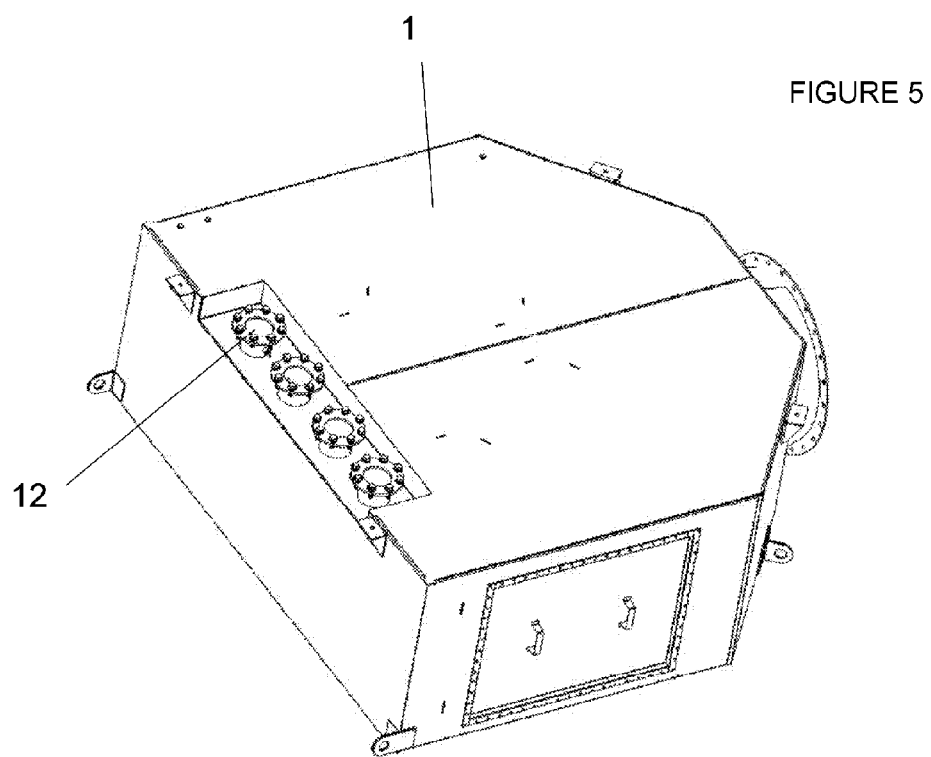
FIG. 5 shows the bottom of the unit with multiple exhaust inlets.

FIG. 5 shows a bottom view of the chamber. Four exhaust inlets 12 are shown. Any number of exhaust inlets can be used to match engine requirements. Quantities and positions of inlets provide the most direct route possible from the engine exhaust outlets. This eliminates the need for costly exhaust collectors/adapters, as well as reducing the total engine back pressure.

Figure 6:
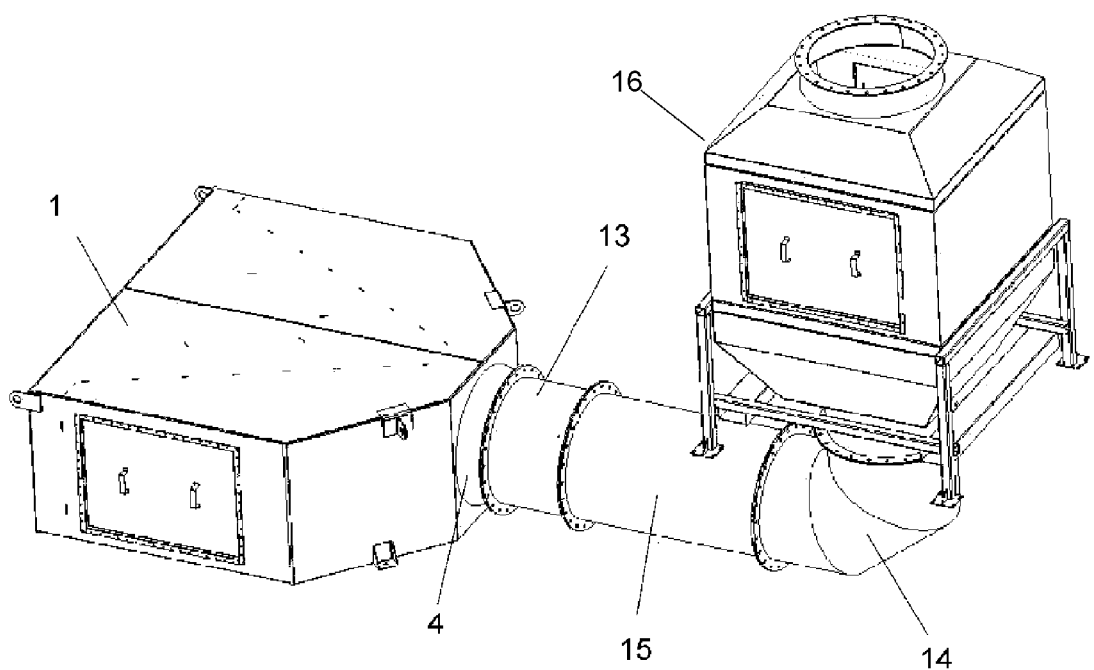
FIG. 6 shows the addition of an SCR.

FIG. 6 shows an embodiment of the invention fitted with a static mixer and injection tube 13 on the exhaust port 4, a mixing tube which can be stainless steel 15 and elbow 14 of approximately the same diameter as the exhaust port 4. An SCR 16 is placed in line to the flow. This leads to Tier 4 operation. A particular SCR that can be used with the present invention is an AirClarity™ SCR system manufactured by GenAcc.

While stainless steel is a preferred material, any material can be used that is strong enough and can withstand the high exhaust temperatures.

Based on engine size, the Tier 4 ready silencer may be smaller or larger, including more or less holes located in the V bank to accept more or less filters/catalysts. The number and size of the inlets may also vary depending on engine size, as well as size of the silencer exit size. For much smaller applications, a flat wall for mounting the filters/catalysts may be used lieu of the V bank, however the horizontal and vertical vanes will still be utilized to direct exhaust flow.

Several descriptions and illustrations have been presented to aid in understanding the present invention. One skilled in the art will realize that numerous changes and variations are possible without departing from the spirit of the invention. Each of these changes and variations is within the scope of the present invention.

We claim:

1. A diesel silencer comprising:
   a chamber adapted to receive diesel exhaust gases, said chamber having at least one side access port, a plurality of exhaust inlet ports and at least one rear exhaust port;
   a V-shaped filter bank contained in said chamber said filter bank mounted in said chamber so as to form a V pointing toward said rear exhaust port, said filter bank containing a plurality of holes, each hole being adapted to receive a DOC or DPF;

a plurality of horizontal flow directing vanes mounted on a front wall of said chamber and a plurality of vertical flow directing vanes mounted on a floor of said chamber, said vanes directing gas flow through said filter bank to said rear exhaust port;

wherein said plurality of exhaust inlet ports are mounted in the floor of said chamber near said front wall.

2. The diesel silencer of claim 1 further comprising a mixing tube attached to said rear exhaust port, said mixing tube also attached to an SCR unit external to said chamber.

3. The diesel silencer of claim 1 wherein there are four exhaust inlet ports.

4. The diesel silencer of claim 1 wherein there are four vertical flow directing vanes.

5. The diesel silencer of claim 1 wherein there are four horizontal flow directing plates.

6. The diesel silencer of claim 1 wherein each of said horizontal and vertical vanes comprises a sheet metal strip containing a plurality of parallel bends.

7. A diesel silencer comprising:
    a chamber adapted to receive diesel exhaust gases, said chamber having at least one access port, a plurality of exhaust inlet ports and at least one exhaust port;
    a filter bank contained mounted in said chamber, said filter bank containing a plurality of holes, each hole being adapted to receive a DOC or DPF;
    a plurality of horizontal flow directing vanes mounted in said chamber and a plurality of vertical flow directing vanes also mounted in said chamber, said horizontal and vertical vanes directing gas flow bank to said exhaust port.

8. The diesel silencer of claim 7 further comprising a mixing tube attached to said rear exhaust port, said mixing tube also attached to an SCR unit external to said chamber.

9. The diesel silencer of claim 7 wherein there are four exhaust inlet ports.

10. The diesel silencer of claim 7 wherein there are four vertical flow directing vanes.

11. The diesel silencer of claim 7 wherein there are four horizontal flow directing plates.

12. The diesel silencer of claim 7 wherein each of said horizontal and vertical vanes comprises a sheet metal strip containing a plurality of parallel bends.

13. The diesel silencer of claim 7 wherein said horizontal flow directing vanes are mounted on a front wall of said chamber.

14. The diesel silencer of claim 7 wherein said vertical flow directing vanes are mounted on a floor of said chamber.

15. A method of silencing a diesel while meeting pollution standards comprising:
    providing a chamber with a floor adapted to receive diesel exhaust gases, said chamber having at least one side access port and at least one rear exhaust port;
    mounting a plurality of exhaust inlet ports in the floor of said chamber near a front wall;
    mounting a V-shaped filter bank in said chamber, said filter bank being mounted in said chamber so as to form a V pointing toward said rear exhaust port, said filter bank containing a plurality of holes, each hole being adapted to receive a DOC or DPF;
    mounting a plurality of horizontal flow directing vanes on a front wall of said chamber and mounting a plurality of vertical flow directing vanes mounted on a floor of said chamber, said vanes directing gas flow through said filter bank to said rear exhaust port.

16. The method of claim 15 further comprising providing a mixing tube attached to said rear exhaust port, said mixing tube also attached to an SCR unit external to said chamber.

17. The dies method of claim 15 wherein there are four exhaust inlet ports.

18. The method of claim 15 wherein there are four vertical flow directing vanes.

19. The method of claim 15 wherein there are four horizontal flow directing plates.

20. The method of claim 15 wherein each of said horizontal and vertical vanes comprises a sheet metal strip containing a plurality of parallel bends.

\* \* \* \* \*